United States Patent [19]
Christenot

[11] 3,897,933
[45] Aug. 5, 1975

[54] VACUUM VALVE

[76] Inventor: Fred A. Christenot, 413 S. 13th St., Livingston, Mont. 59047

[22] Filed: Dec. 20, 1973

[21] Appl. No.: 426,468

[52] U.S. Cl. .............. 251/248; 251/292; 251/309; 251/340
[51] Int. Cl. ............................................ F16k 31/53
[58] Field of Search .......... 251/228, 248, 250, 292, 251/304, 309, 340

[56] References Cited
UNITED STATES PATENTS

| 543,220 | 7/1895 | Ross | 251/309 |
|---|---|---|---|
| 2,912,870 | 11/1959 | Green | 251/250 |
| 3,419,248 | 12/1968 | Berger | 251/309 |
| 3,664,372 | 5/1972 | Marshall | 251/292 X |

Primary Examiner—Martin P. Schwadron
Assistant Examiner—David R. Matthews
Attorney, Agent, or Firm—Victor J. Evans & Co.

[57] ABSTRACT

The present invention relates to a vacuum valve in which an elongate body having a longitudinal bore is provided with a transverse rotary plug with a bore extending therethrough adapted to align with the bore in the body. The plug is provided with seals at each end and has gear teeth formed in a portion of its circumference to mesh with a gear slide mounted for sliding movement on the exterior of the body. The slide is thumb operated and when moved longitudinally of the body, rotates the plug to open and close the port in the body.

3 Claims, 6 Drawing Figures

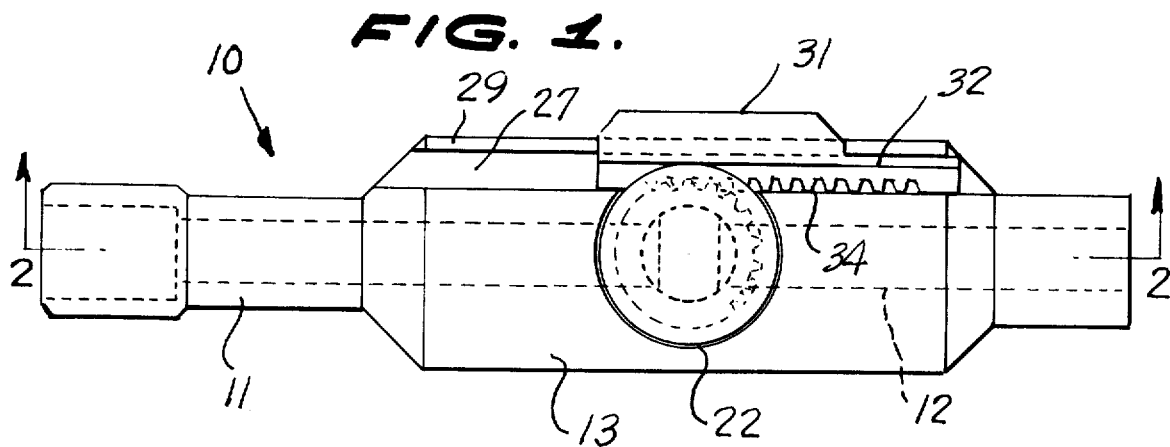
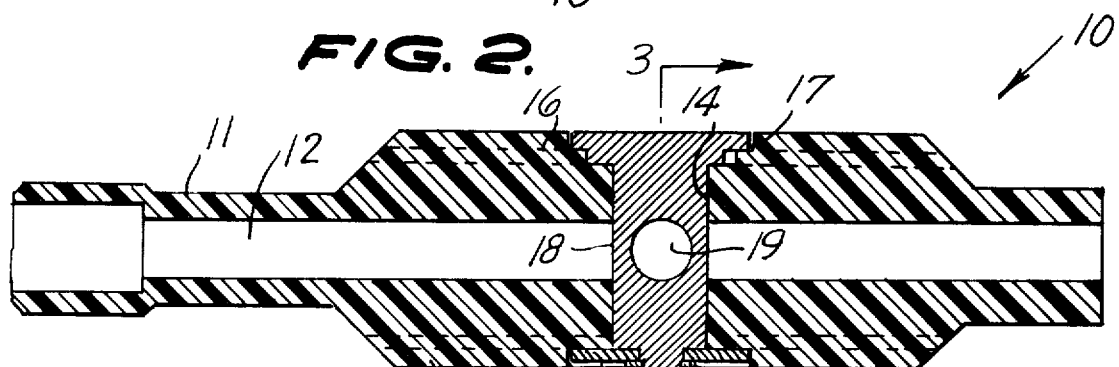
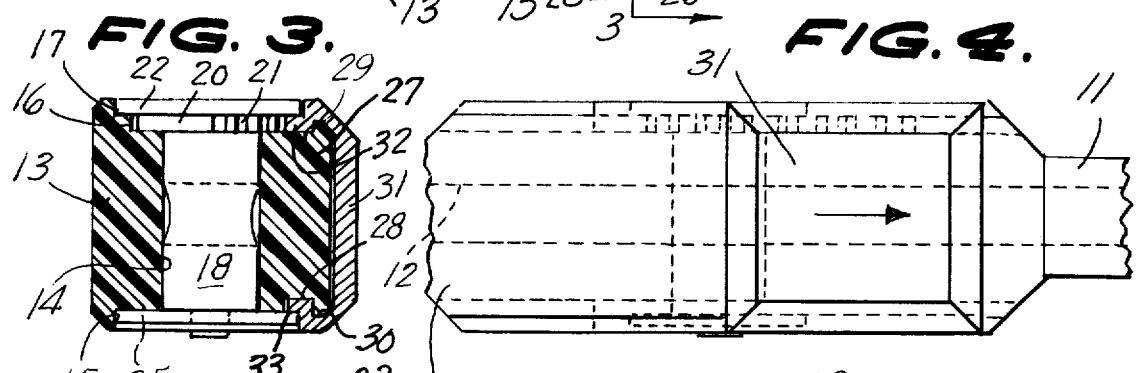
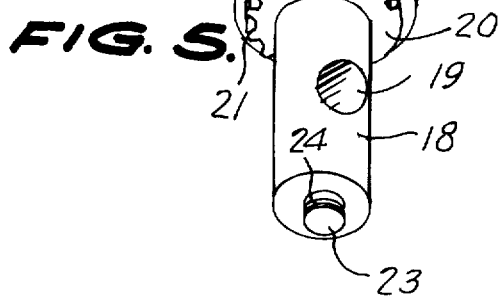
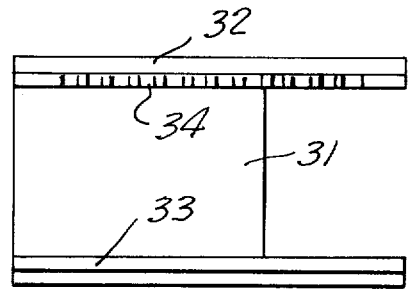

VACUUM VALVE

BACKGROUND OF THE INVENTION

1. Field of the Invention

The present invention relates to manually operated variable valves for vacuum outlets.

2. Summary of the Invention

In the present invention a bore extends through an elongate body and has a transversely extending plug mounted for rotation therein with the plug having a bore which can be aligned with the bore in the body for rotating the plug. A slide is mounted for reciprocating movement longitudinally of the body and has gear teeth meshing with gear teeth on the plug to rotate the plug as the slide is moved by thumb pressure of the operator.

The primary object of the invention is to provide a manually operated variable valve for vacuum outlets which gives a smooth easy infinitely variable control of flow through the valve while providing maintenance free, non-clogging operation of the valve.

Other objects and advantages will become apparent in the following specification when considered in light of the attached drawings.

BRIEF DESCRIPTION OF THE DRAWINGS

FIG. 1 is a side elevation of the invention;

FIG. 2 is a longitudinal sectional view taken along the line 2—2 of FIG. 1, looking in the direction of the arrows;

FIG. 3 is a transverse sectional view taken along the linie 3—3 of FIG. 2, looking in the direction of the arrows;

FIG. 4 is a fragmentary top plan view of the invention;

FIG. 5 is a perspective view of the valve plug removed from the body; and

FIG. 6 is a bottom plan view of the slide removed from the body.

DESCRIPTION OF THE PREFERRED EMBODIMENT

Referring now to the drawings in detail wherein like reference characters indicate like parts throughout the several figures, the reference numeral 10 indicates generally the hand actuated vacuum valve constructed in accordance with the invention.

The valve 10 includes an elongate body 11 having a longitudinal bore 12 extending completely therethrough. The body 11 has an enlarged, generally rectangular central portion 13 provided with the transverse bore 14 extending perpendicularly thereacross. The lower end of the bore 14 is provided with a counter bore 15 having a diameter substantially greater than the bore 14 and communicating with the bore 14. The enlarged portion 13 of the body 11 has a counter bore 16 formed therein communicating with the upper end of the bore 14 and having a diameter substantially greater than the bore 14. A second counter bore 17 also opens into the enlarged portion 13 and communicates with the counter bore 16. The counter bore 17 has a diameter substantially greater than the counter bore 16 for reasons to be assigned.

A cylindrical valve plug 18 is mounted for rotation in the bore 14 and is provided with a transverse bore 19 having a diameter equal to the diameter of the bore 12. The valve plug 18 has a disc 20 integrally formed on the upper end thereof and carrying gear teeth 21 for a portion of its diameter. A second disc 22 having a diameter substantially greater than the disc 20 is integrally formed with the disc 20 and the plug 18. The plug 18, disc 20 and disc 22 are formed coaxially. A reduced diameter axial extension 23 is formed on the lower end of the plug 18 opposite the disc 20. The extension 23 has a circumferential groove 24 formed adjacent its lower end that can be best seen in FIGS. 2 and 5.

A sealing washer 25 is adapted to be mounted on the extension 23 in sealing engagement in the counter bore 15 and is secured onto the extension 23 by a snap spring retainer 26 engaged in the groove 24.

The enlarged portion 13 of the body 11 is provided with a pair of spaced parallel grooves 27, 28 forming flanges 29, 30, as can be seen in FIG. 3. A thumb actuated slide 31 is mounted on the enlarged portion 13 of the body 11 and has a pair of oppositely disposed bars 32, 33 which engage in the grooves 27, 28 respectively to secure the slide 31 to the enlarged portion 13 of the body 11. The bar 32 is provided with a plurality of gear teeth 34 on the lower edge thereof which mesh with the teeth 21 on the disc 20. The teeth 34 stop short of the opposite ends of the bar 32 so as to limit the travel of the bar 32 and the plug 18.

The disc 22 provides a seal for the upper end of the plug 18 with respect to the enlarged portion 13 of the body 11.

In assembling the valve 10, the slide 31 is initially mounted onto the enlarged portion 13 of the body 11 and is moved to the position illustrated in FIG. 1. The valve plug 18 is positioned so that the bore 19 therethrough is at right angles to the bore 12, and the plug 18 is inserted into the bore 14 until the gear teeth 21 mesh with the gear teeth 34. The sealing washer 25 is then engaged over the extension 23 and the spring clip 26 is inserted in the groove 24 to secure the valve 10 together ready for operation.

In the use and operation of the invention, thumb pressure is brought to bear on the slide 31 to move the slide 31 in the grooves 27, 28 and thus rotate the plug 18 in the bore 14 to align and disalign the bore 19 with the bore 12.

It should be noted that the valve can be constructed of any suitable material including plastic, metal and combinations of these materials as desired. It should also be noted that the valve can be easily and quickly disassembled and reassembled for cleaning and sterilization whenever this becomes necessary.

Having thus described the preferred embodiment of the invention, it should be understood that numerous structural modifications and adaptations may be resorted to without departing from the spirit of the invention.

What is claimed is:

1. A thumb actuated vacuum valve comprising an elongate body having a generally rectangular cross section and four side faces, a longitudinal bore extending completely through said body, a transverse bore extending through said body opening through one of said side faces and extending to and opening through an opposite parallel side face intersecting said longitudinal bore, a pair of parallel outwardly opening grooves formed in opposed side faces adjacent one of said side faces throughwhich said transverse bore opens, a rotary valve plug mounted in said transverse bore for rotation therein with said plug having the bore extending therethrough adapted to be aligned with the longitudinal bore in said body upon rotation of said plug, gear teeth around a portion of the diameter of said plug adjacent one end of said plug, a hand actuated slide on said body, a pair of bars on said slide engaging in said groove for mounting said slide for sliding movement along said body, and gear teeth on one of said bars meshing with the gear teeth on said plug for rotating said plug upon sliding movement of said slide.

2. A device as claimed in claim 1 including seals at each end of said valve plug for sealing said valve plug in said body.

3. A device as claimed in claim 1 including detachable means securing said plug in said body.

* * * * *